United States Patent
Army et al.

(10) Patent No.: US 9,255,645 B2
(45) Date of Patent: Feb. 9, 2016

(54) RECONFIGURABLE VALVE

(71) Applicant: HAMILTON SUNDSTRAND CORPORATION, Windsor Locks, CT (US)

(72) Inventors: Donald E. Army, Enfield, CT (US); Peter J. Dowd, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 240 days.

(21) Appl. No.: 13/856,153

(22) Filed: Apr. 3, 2013

(65) Prior Publication Data

US 2014/0299199 A1 Oct. 9, 2014

(51) Int. Cl.
| | |
|---|---|
| *F16K 11/02* | (2006.01) |
| *F16K 31/08* | (2006.01) |
| *F16K 11/07* | (2006.01) |
| *F25B 41/04* | (2006.01) |
| *F28F 27/02* | (2006.01) |
| *B64D 13/00* | (2006.01) |

(52) U.S. Cl.
CPC ............ *F16K 11/02* (2013.01); *F16K 11/0716* (2013.01); *F16K 31/086* (2013.01); *B64D 13/00* (2013.01); *F25B 41/046* (2013.01); *F28F 27/02* (2013.01); *Y10T 137/0502* (2015.04); *Y10T 137/86879* (2015.04)

(58) Field of Classification Search
CPC ... F16K 11/02; F16K 31/086; F16K 11/0716; F28F 27/02
USPC ..................... 137/269, 625.69, 597
See application file for complete search history.

(56) References Cited

U.S. PATENT DOCUMENTS

| | | | |
|---|---|---|---|
| 3,719,199 A * | 3/1973 | Mentink ....................... 137/269 |
| 3,937,253 A * | 2/1976 | Lilja ....................... 137/625.18 |
| 4,361,121 A | 11/1982 | Clemens et al. |
| 6,415,595 B1 | 7/2002 | Wilmot, Jr. et al. |
| 7,124,777 B2 | 10/2006 | Moreno et al. |
| 7,152,416 B2 | 12/2006 | Lifson et al. |
| 7,197,890 B2 | 4/2007 | Taras et al. |
| 7,272,948 B2 | 9/2007 | Taras et al. |

(Continued)

FOREIGN PATENT DOCUMENTS

| | | |
|---|---|---|
| FR | 1506181 A | 12/1967 |
| JP | 55100753 U | 7/1980 |

(Continued)

OTHER PUBLICATIONS

European Search Report issued in EP 14162831.3 on Jul. 7, 2014, 7 pages.

*Primary Examiner* — Kevin Lee
(74) *Attorney, Agent, or Firm* — Cantor Colburn LLP

(57) ABSTRACT

A valve is provided. The valve includes a body defining an interior and apertures, additional bodies each having opposed, open ends and being respectively coupled to each of the apertures at one of the respective open ends to define a flow path through each of the additional bodies and into the interior and a valve member. The valve member is disposable in first and second positions in the interior. In the first position, the valve member fluidly couples pairs of the additional bodies with one another via first combined flow paths that crisscross through the interior. In the second position, the valve member fluidly couples different pairs of the additional bodies with one another via second combined flow paths that are substantially parallel through the interior.

9 Claims, 2 Drawing Sheets

(56) References Cited

U.S. PATENT DOCUMENTS

| | | |
|---|---|---|
| 7,275,384 B2 | 10/2007 | Taras et al. |
| 7,491,037 B2 | 2/2009 | Edwards |
| 7,631,661 B2 | 12/2009 | Moreno |
| 8,047,014 B2 | 11/2011 | Yabu et al. |
| 8,056,348 B2 | 11/2011 | Murakami et al. |
| 8,074,459 B2 | 12/2011 | Murakami et al. |
| 8,220,531 B2 | 7/2012 | Murakami et al. |
| 8,297,065 B2 | 10/2012 | Vaisman et al. |
| 8,387,659 B2 * | 3/2013 | Hunnicutt ................ 137/625.35 |
| 2012/0160446 A1 | 6/2012 | Creed et al. |

FOREIGN PATENT DOCUMENTS

| | | |
|---|---|---|
| JP | 61192974 A | 8/1986 |
| JP | 61181167 U | 11/1986 |

\* cited by examiner

RECONFIGURABLE VALVE

BACKGROUND OF THE INVENTION

The subject matter disclosed herein relates to a reconfigurable valve and, more particularly, to an aircraft including a reconfigurable valve.

For an aircraft that uses a vapor cycle cooling system, the vapor cycle cooling system typically requires two ram cooled vapor cycle packs (VCPs). The direction of refrigerant flow through the VCP is dependent on which side of the aircraft the VCP is installed. Each VCP includes two independently actuated three-way valves that enable the refrigerant flow through a multi-pass condenser to be reconfigured in order to accommodate RAM flow from opposite sides of the aircraft.

BRIEF DESCRIPTION OF THE INVENTION

According to one aspect of the invention, a valve is provided. The valve includes a body defining an interior and apertures, additional bodies each having opposed, open ends and being respectively coupled to each of the apertures at one of the respective open ends to define a flow path through each of the additional bodies and into the interior and a valve member. The valve member is disposable in first and second positions in the interior. In the first position, the valve member fluidly couples pairs of the additional bodies with one another via first combined flow paths that crisscross through the interior. In the second position, the valve member fluidly couples different pairs of the additional bodies with one another via second combined flow paths that are substantially parallel through the interior.

According to another aspect of the invention, an aircraft is provided and includes a receiver inlet, a compressor outlet, left and right condenser inlets, left and right condenser outlets and a reconfigurable valve disposable to fluidly couple the compressor outlet with the right condenser inlet and the right condenser outlet with the receiver inlet or to fluidly couple the compressor outlet with the left condenser inlet and the left condenser outlet with the receiver inlet.

According to yet another aspect of the invention, a method of valve installation for an aircraft is provided. The method includes disposing a reconfigurable valve to fluidly couple one of a compressor outlet with a right condenser inlet and a right condenser outlet with a receiver inlet and the compressor outlet with a left condenser inlet and a left condenser outlet with the receiver inlet, reconfiguring the reconfigurable valve and disposing the reconfigurable valve to fluidly couple the other of the compressor outlet with a left condenser inlet and a left condenser outlet with the receiver inlet and the compressor outlet with the right condenser inlet and the right condenser outlet with the receiver inlet.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

A reconfigurable valve, as described herein, may be employed to replace the two independently actuated three-way valves normally included in a VCP in an aircraft. The reconfigurable valve enables refrigerant flow to be reversed through the condenser to thereby allow for a single vapor cycle cooling system (VCS) to be used in symmetric aircraft installations (otherwise the multiple valves or handed packs as noted above would be required). The use of the reconfigurable valve avoids the need for asymmetric RAM circuits, which can impact system performance, and fewer parts and thus increased reliability. In addition, the reconfigurable valve may provide a visual RH/LH position indication for mechanics to confirm the pack has been properly configured to operate on the side of the aircraft that it is installed in.

Figure 1:
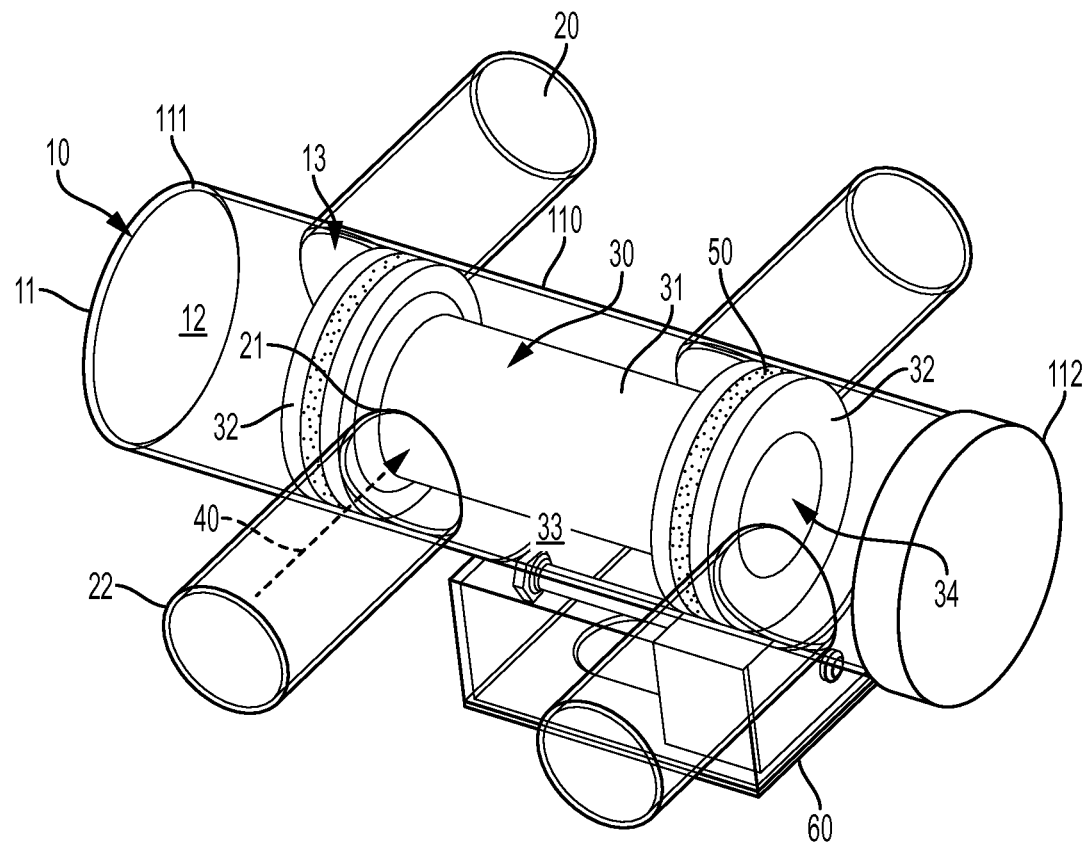
FIG. 1 is a perspective view of a reconfigurable valve in accordance with embodiments.
Figure 2:
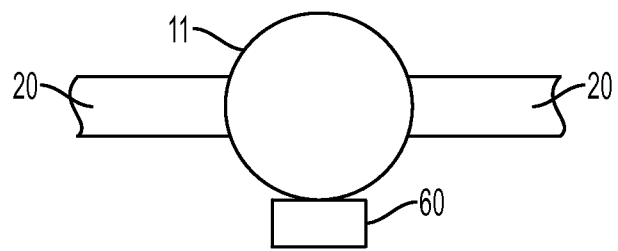
FIG. 2 is an axial view of the reconfigurable valve of FIG. 1.

With reference to FIGS. 1 and 2, a reconfigurable valve 10 is provided. The reconfigurable valve 10 includes a body 11 that is formed to define an interior 12 and a set of apertures 13. In accordance with embodiments, the body 11 may be provided as a tubular element 110 with closed, long ends 111, 112 that defines the set of apertures 13 as four apertures 13 along sides of the tubular element 110 in, for example, a 2×2 staggered formation (see FIG. 1).

The reconfigurable valve 10 further includes additional bodies 20 and a valve member 30. Where the body 11 defines four apertures 13, the additional bodies 20 may be provided in a set of four additional bodies 20 as well. Each additional body 20 has opposed, open ends 21, 22 and may be respectively coupled to a corresponding one of the apertures 13 at one of the respective open ends (i.e., end 21, which is formed to fit onto the body 11. The four additional bodies 20 thus define four respective flow paths 40 through the additional bodies 20 and into the interior 12. In an embodiment where the reconfigurable valve 10 is provided in an aircraft, the four additional bodies 20 may each be coupled to a compressor outlet, a VCP condenser inlet (left or right side), a VCP condenser outlet (left or right side) and a receiver inlet as will be described below.

The valve member 30 is disposable in the interior 12 in a first position or a second position. In the first position, the valve member 30 fluidly couples pairs of the additional bodies 20 with one another via first combined flow paths 300 (see the dashed arrows in FIG. 4) that crisscross with each other through the interior 12. In the second position, the valve member 30 fluidly couples different pairs of the additional bodies 20 with one another via second combined flow paths 301 (see the dashed arrows in FIG. 3) that are substantially parallel with each other through the interior 12 though it is to be understood that a lateral portion 302 of one of the second combined flow paths 301 is defined through but is insulated from the other of the second combined flow paths 301. In the case of four apertures 13 and four additional bodies 20, the valve member 30 fluidly couples two pairs of the four additional bodies 20 with one another via the interior 12 in the first position and fluidly couples two different pairs of the four additional bodies 20 with one another via the interior 12 in the second position such that, in each case, the valve member 30 forms two combined flow paths 300 (in the case where the valve member 30 is in the first position) and 301 (in the case where the valve member 30 is in the second position).

As shown in FIG. 1, the valve member 30 may have a dumbbell shape with a hollow, central shaft 31 and valve portions 32 at opposite, distal ends of the hollow, central shaft 31. The hollow, central shaft 31 has a smaller dimension than the body 11 (i.e., the hollow, central shaft 31 has a smaller diameter than the tubular element 110) while the valve portions 32 have certain similar dimensions as the body 11 (i.e., outer diameters of the valve portions 32 are similar to the diameter of the tubular element 110). The valve member 30 is disposable in the interior 12 of the body 11 such that the hollow, central shaft 31 defines an annulus 33 between an exterior surface thereof, an interior surface of the body 11 and interior, axial surfaces of the valve portions 32. The valve portions 32 isolate the annulus 33 from fluid communication with an interior 34 of the hollow, central shaft 31.

In accordance with embodiment, seal elements 50 may be disposed on outer diameters of the valve portions 32 such that the seal elements 50 are interposed between the valve portions 32 and the interior surface of the body 11. The seal portions 50 may include O-rings or another similar feature.

The reconfigurable valve 10 may further include a controller 60. The controller 60 is configured to selectively position the valve member 30 in one of the first portion or the second position. In accordance with embodiments, the controller 60 and the valve member 30 may each include ferromagnetic materials such that the controller 60 may electromagnetically position the valve member 30. That is, the controller 60 may be slidably coupled to a side of the body 11, which is adjacent to the sides the additional bodies 20 are coupled to (see FIG. 2). When the controller 60 is slid along the side of the body 11, the controller 60 causes the valve member 30 to correspondingly translate in position.

In accordance with embodiments of the invention, the valve member 30 should be maintained in the first or the second position until it is to be serviced, repaired or replaced. Thus, movement from the first to the second position and vice versa should not occur under normal circumstances. However, it is possible that the reconfigurable valve 10 may be employed in certain applications where reversed flows occur. In these cases, the controller 60 may be configured to selectively position the valve member 30 in an active state. That is, the controller 60 may position the valve member 30 in the first position and then reposition the valve member 30 in the second position during an operation of the reconfigurable valve 10. Similarly, the controller 60 may position the valve member 30 in the second position and then reposition the valve member 30 in the first position during an operation of the reconfigurable valve 10.

Figure 3:
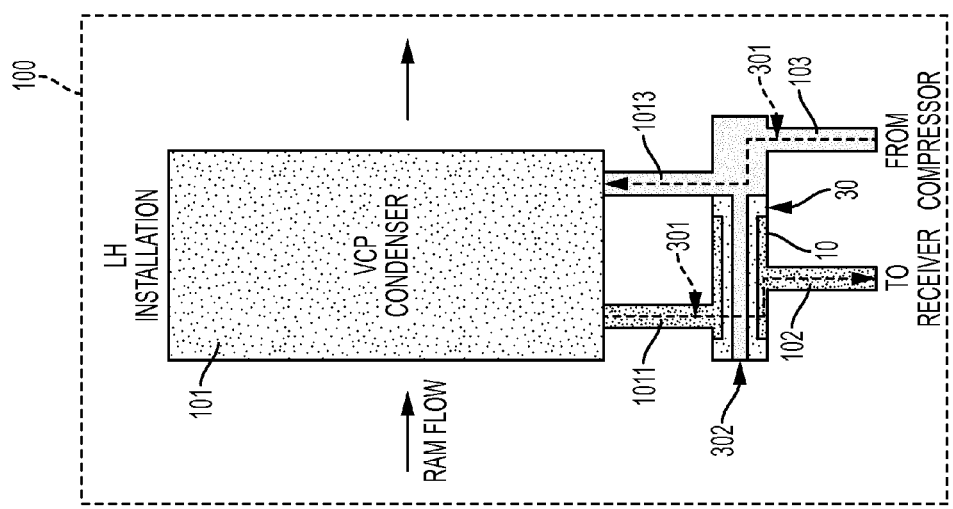
FIG. 3 is a plan view of the reconfigurable valve of FIG. 1 disposed for left side installation.
Figure 4:
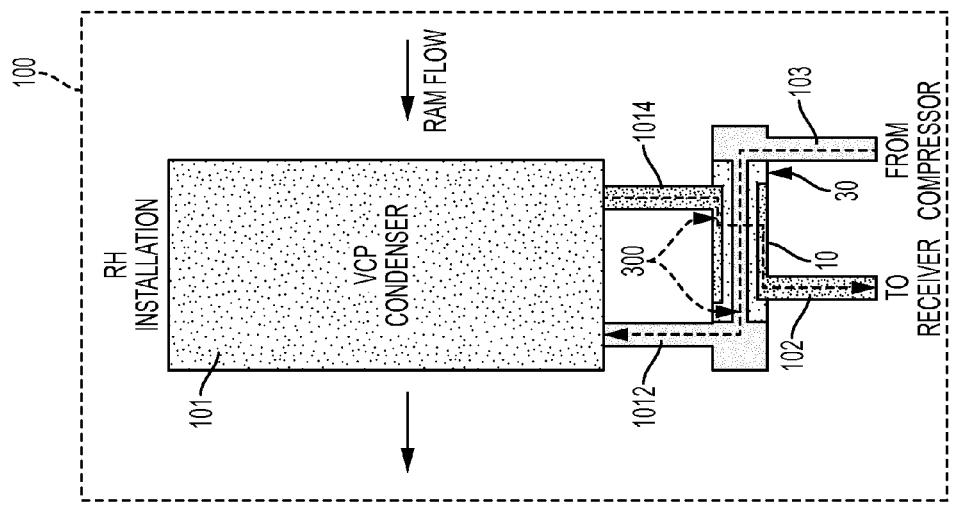
FIG. 4 is a plan view of the reconfigurable valve of FIG. 1 disposed for right side installation.

With reference to FIGS. 3 and 4, the reconfigurable valve 10 may be provided for use in an aircraft 100 in a left side installation (see FIG. 3), in which RAM air flow would be expected to flow in a first direction, or a right side installation (see FIG. 4), in which the RAM air flow would be expected to flow a second direction opposite the first direction. As shown in FIGS. 3 and 4, the aircraft 100 includes a VCP condenser 101, a receiver inlet 102, a compressor outlet 103, a left condenser outlet 1011 (see FIG. 3), a right condenser inlet 1012 (see FIG. 4), a left condenser inlet 1013 (see FIG. 3) and a right condenser outlet 1014 (see FIG. 4).

For the left side installation of FIG. 3, the valve member 30 of the reconfigurable valve 10 may be positioned in the first position by the controller 60 prior to installation. Subsequently, the reconfigurable valve 10 may be disposed in the aircraft 20 to fluidly couple the compressor outlet 103 with the left condenser inlet 1013 and to fluidly couple the left condenser outlet 1011 with the receiver inlet 102. As such, the valve member 30 in FIG. 3 defines the two combined flow paths 301, which are identified by the dashed arrows in FIG. 3, as being substantially parallel with each other except for the lateral portion 302 of the one of the second combined flow paths 301. By contrast, for the right side installation of FIG. 4, the valve member 30 of the reconfigurable valve 10 may be positioned in the second position by the controller 60 prior to installation. Subsequently, the reconfigurable valve 10 may be disposed in the aircraft 20 to fluidly couple the compressor outlet 103 with the right condenser inlet 1012 and to fluidly couple the right condenser outlet 1014 with the receiver inlet 102. As such, the valve member 30 in FIG. 4 defines the two combined flow paths 300, which are identified by the dashed arrows in FIG. 4, as crisscrossing with each other.

It is to be understood that the VCP condensers 101 shown in FIGS. 3 and 4 are constructed in similar manners but have opposing functionalities. That is, the left condenser outlet 1011 of FIG. 3 in which RAM flow proceeds in the first direction from left-to-right is similar in construction and relative position to the right condenser inlet 1012 of FIG. 4 in which the RAM flow proceeds in the second direction from right-to-left. Concurrently, the left condenser inlet 1013 of FIG. 3 in which RAM flow proceeds again in the first direction from left-to-right is similar in construction and relative position as the right condenser outlet 1014 of FIG. 4 in which the RAM flow proceeds again in the second direction from right-to-left.

Thus, it may be understood that the aircraft 100 may be provided with two reconfigurable valves 10 with one disposed in the left side installation (and the valve member 30 disposed in the first position by the controller 60) and one disposed in the right side installation (and the valve member 30 disposed in the second position by the controller 60). In such a case, the two reconfigurable valves 10 may be interchangeable with one another. Thus, during servicing, repair or replacement, the reconfigurable valves 10 may be removed from the aircraft 100, reconfigured and re-installed. This installation requires that the position of the valve member 30 be determined such that the reconfigurable valve 10 can be installed in the correct side.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A valve, comprising:
a body defining an interior and apertures;
additional bodies each having opposed, open ends and being respectively coupled to each of the apertures at one of the respective open ends to define a flow path through each of the additional bodies and into the interior; and
a valve member, which is disposable in first and second positions in the interior, wherein:

in the first position, the valve member fluidly couples pairs of the additional bodies with one another via first combined flow paths that crisscross through the interior, and in the second position, the valve member fluidly couples different pairs of the additional bodies with one another via second combined flow paths that are substantially parallel through the interior, wherein the valve further comprises a controller slidably coupled to a side of the body and configured to selectively and electromagnetically position the valve member in one of the first or second positions.

2. The valve according to claim 1, wherein the apertures are provided as four apertures and the additional bodies are correspondingly provided as four additional bodies.

3. The valve according to claim 2, wherein the valve member fluidly couples two pairs of the four additional bodies with one another via the interior in the first position and fluidly couples two different pairs of the four additional bodies with one another via the interior in the second position.

4. The valve according to claim 1, wherein the body comprises a tubular element with closed, long ends.

5. The valve according to claim 4, wherein the apertures are defined along sides of the tubular element.

6. The valve according to claim 4, wherein the apertures are defined in a staggered formation along sides of the tubular element.

7. The valve according to claim 1, wherein the valve member has a dumbbell shape with a hollow, central shaft and the controller is slidably coupled to a side of the hollow, central shaft.

8. The valve according to claim 1, wherein the valve member comprises:

a hollow, central shaft; and valve portions at distal ends of the hollow, central shaft, the hollow, central shaft having a side to which the controller is slidably coupled and defining an annulus between an exterior surface thereof, an interior surface of the body and interior surfaces of the valve portions, and the valve portions isolating the annulus from fluid communication with an interior of the hollow, central shaft.

9. The valve according to claim 8, further comprising seal elements interposed between the valve portions and the body.

* * * * *